(12) United States Patent
Kang et al.

(10) Patent No.: US 8,911,854 B2
(45) Date of Patent: Dec. 16, 2014

(54) OPTICAL FILM AND A PRODUCTION METHOD THEREFOR

(75) Inventors: Byoung-Il Kang, Daejeon (KR); Chang-Hun Han, Daejeon (KR); Chan-Hong Lee, Daejeon (KR); Dae-Woo Lee, Busan (KR); Jae-Bum Seo, Yeosu-si (KR); Sang-Seop Kim, Seoul (KR)

(73) Assignee: LG Chem, Ltd., Seoul (KR)

( * ) Notice: Subject to any disclaimer, the term of this patent is extended or adjusted under 35 U.S.C. 154(b) by 604 days.

(21) Appl. No.: 12/993,785

(22) PCT Filed: Jun. 3, 2009

(86) PCT No.: PCT/KR2009/002952
§ 371 (c)(1),
(2), (4) Date: Nov. 19, 2010

(87) PCT Pub. No.: WO2009/148260
PCT Pub. Date: Dec. 10, 2009

(65) Prior Publication Data
US 2011/0097561 A1    Apr. 28, 2011

(30) Foreign Application Priority Data
Jun. 3, 2008 (KR) .................. 10-2008-0051993

(51) Int. Cl.
B32B 27/30 (2006.01)
C08L 51/04 (2006.01)
B82Y 20/00 (2011.01)
C08J 5/18 (2006.01)
G02B 5/30 (2006.01)

(52) U.S. Cl.
CPC ............ C08J 5/18 (2013.01); *C08J 2333/06* (2013.01); *C08J 2351/04* (2013.01); *G02B 5/3083* (2013.01); *Y10S 977/779* (2013.01); *Y10S 977/782* (2013.01)
USPC ........... 428/212; 428/141; 428/220; 428/327; 428/407; 977/779; 977/782; 264/1.6; 525/71

(58) Field of Classification Search
USPC .............. 525/71–82; 428/212, 220, 327, 500, 428/521–522, 403, 407, 141; 977/779, 782; 264/1.6
See application file for complete search history.

(56) References Cited

U.S. PATENT DOCUMENTS

| | | | | |
|---|---|---|---|---|
| 3,509,238 | A | * | 4/1970 | Aubrey et al. .................. 525/71 |
| 5,969,042 | A | * | 10/1999 | Tiefensee et al. ............... 525/83 |
| 6,812,065 | B1 | | 11/2004 | Kitamura |
| 2005/0275334 | A1 | | 12/2005 | Park et al. |
| 2007/0243364 | A1 | | 10/2007 | Maekawa et al. |

FOREIGN PATENT DOCUMENTS

| | | |
|---|---|---|
| EP | 1 933 181 A1 | 6/2008 |
| JP | 2001-253990 A | 9/2001 |
| JP | 2006-274118 A | 10/2006 |
| JP | 2007-032304 A1 | 3/2007 |
| JP | 2008-255149 A | 10/2008 |
| JP | 2008-260786 A | 10/2008 |
| KR | 10-2001-0043982 A | 5/2001 |
| KR | 10-2005-0106716 A | 11/2005 |
| KR | 10-2006-0090172 A | 8/2006 |
| KR | 10-2007-0006928 A | 1/2007 |
| KR | 10-2007-0006928 | 11/2007 |
| KR | 10-2009-0028913 | 3/2009 |
| KR | 10-2009-0028913 A | 3/2009 |
| WO | WO 2009/038342 A2 | 3/2009 |

* cited by examiner

*Primary Examiner* — Prashant J Khatri
(74) *Attorney, Agent, or Firm* — McKenna Long & Aldridge LLP

(57) ABSTRACT

The present invention provides an optical film and s retardation film characterized in that each of them includes: an acrylic resin; and 20-65 parts by weight of at least two graft copolymers containing a conjugated diene-based rubber, based on 100 parts by weight of the acrylic resin, wherein at least two of the graft copolymers have different particle sizes. The present invention also provides a production method therefore.

11 Claims, No Drawings

OPTICAL FILM AND A PRODUCTION METHOD THEREFOR

This application is a National Stage Application of PCT/KR2009/002952, filed on Jun. 3, 2009, which claims the benefit of Korean Patent Application Nos. 10-2008-0051993, filed Jun. 3, 2008, each of which are hereby incorporated by reference for all purposes as if fully set forth herein in their entireties.

TECHNICAL FIELD

The present invention relates to an optical film and a production method therefore, and more particularly, to an optical film having superior thermal stability and toughness and low haze, which can be advantageously used in electronic devices, including display devices such as LCDs, and a production method therefore.

This application claims the priority of Korean Patent Application No. 2008-0051993 filed on Jun. 3, 2008 in the Korean Intellectual Property Office, the disclosures of which are incorporated herein by reference.

BACKGROUND ART

Recently, with the development of optical technology, various display technologies for replacing a conventional cathode ray tube (CRT) have been suggested, and various types of display devices such as plasma display panels (PDPs), liquid crystal displays (LCDs), organic/inorganic EL displays (ELDs) and the like have been commercially available on the markets. In the above-mentioned displays, the use of various types of plastic films has been suggested and the required characteristics thereof have been sophisticated. For example, in order to achieve slim and lightweight LCDs and improve display characteristics, various types of plastic films are used in a polarizing plate, a retardation film, a plastic substrate, a light guide plate, and the like.

In general, the polarizing plate has a structure in which a triacetyl cellulose film (hereinafter, referred to as a "TAC film"), acting as a protective film, is laminated onto the polarizer by an aqueous adhesive made of a polyvinyl alcohol-based aqueous solution. However, both the polyvinyl alcohol film used as the polarizer and the TAC film used as the polarizer protective film have poor heat resistance and moisture resistance. Therefore, if the polarizing plate that is made of these films is used in a high-temperature or high-humidity atmosphere for a long period of time, the degree of polarization thereof will be reduced, the polarizer and the protective film will be separated from each other, and the optical properties thereof will be reduced. Thus, such a polarizing plate has various limitations in its applications. In addition, in the case of the TAC film, in-plane retardation ($R_{in}$) and thickness retardation ($R_{th}$) are greatly changed according to a change in the ambient temperature/humidity environment. In particular, a change in retardation with respect to incident light in an inclined direction is great. If the polarizing plate that includes the TAC film having the above-mentioned characteristics is applied to an LCD as the protective film, there will be a problem in that the viewing angle characteristics are changed according to the change in the ambient temperature/humidity environment, thus reducing image quality. In addition, in the case of the TAC film, the change in dimension according to the change in the ambient temperature/humidity environment is great and the photoelastic coefficient is also relatively high, and thus, after evaluation of durability in a heat-resistant and moisture-resistant environment, a change in retardation characteristics occurs locally, thereby adversely affecting image quality.

As a material to complement the disadvantages of the TAC film, a methacrylic resin is well known. However, it is known that the methacrylic resin has a property that it is easily broken or split. And it is also known that the property causes problems in terms of transportability during the production of the polarizing plate and resulting in poor productivity. In addition, in the case in which acrylate resin is used as the material of the film, there is a problem in that it is required to use a casting method which is both costly and difficult to perform.

In the case of a retardation film, a film made of a styrene-based resin is a material showing the optical anisotropic property that the refractive index is increased perpendicular to the alignment direction when the film is stretched and aligned. It is known that the styrene-based resin is a material useful for manufacturing a film having the positive thickness retardation ($R_{th}$) by a stretching process. In addition, the styrene-based resin has the advantages of excellent economic efficiency and transparency. However, the styrene-based resin has the problems of insufficient heat resistance and poor mechanical properties, except for the case in which it is prepared using a costly special monomer. In addition, in the case in which a retardation film is manufactured by stretching a polycarbonate resin, it is possible to provide a sufficient retardation function; however, the change in retardation with respect to the degree of stretching is great and it is difficult to provide a film having a uniform and stable retardation function.

DISCLOSURE

Technical Problem

An aspect of the present invention provides an optical film that can be manufactured in an easy and cost-effective extrusion process, can have excellent heat resistance, toughness and low haze properties, can be used in various applications, including polarizer protective films, due to its excellent optical isotropic properties before being stretched, and can be used as a retardation film, because it can provide a uniform and stable retardation after being stretched, and a method for manufacturing the same.

Technical Solution

According to an aspect of the present invention, there is provided an optical film including: an acrylic resin; and 20-65 parts by weight of at least two graft copolymers containing a conjugated diene-based rubber, based on 100 parts by weight of the acrylic resin, wherein at least two of the graft copolymers have different particle sizes.

According to another aspect of the present invention, there is provided a production method for an optical film, including: preparing a resin composition including an acrylic resin and 20-65 parts by weight of at least two graft copolymers containing a conjugated diene-based rubber, based on 100 parts by weight of the acrylic resin, wherein at least two of the graft copolymers have different particle sizes; and forming a film using the resin composition.

According to another aspect of the present invention, there is provided a retardation film manufactured by stretching the optical film.

According to another aspect of the present invention, there is provided an electronic device including the optical film or the retardation film.

Advantageous Effects

The optical film according to the present invention has excellent heat resistance and toughness and shows excellent optical properties, including low haze. Also, it can be used in various applications, including polarizer protective films, due to its excellent isotropic properties before being stretched, and thus can substitute for costly TAC resin. Moreover, it can provide a uniform and stable retardation after being stretched, and thus can be used as a retardation film. In addition, because the optical film according to the present invention can be manufactured by an easy, cost-effective extrusion process, it has excellent effects compared to an existing film made of only acrylate resin.

BEST MODE

Exemplary embodiments of the present invention will now be described in detail.

An optical film according to an embodiment of the present invention includes an acrylic resin and 20-65 parts by weight of at least two graft copolymers containing a conjugated diene-based rubber, based on 100 parts by weight of the acrylic resin, wherein at least two of the graft copolymers have different particle sizes.

Since a film material used in image display devices such as LCDs requires high heat resistance and high stability to UV radiation or the like, it is known that the film material does not include a conjugated diene-based compound containing a double bond. Accordingly, there has been no prior example in which an impact modifier containing a conjugated diene-based rubber has been used in an amount as large as 20-65 parts by weight based on 100 parts of an acrylic resin (serving as a matrix resin) in order to manufacture a film that is used in applications requiring heat resistance, including image display devices such as LCDs. However, the present inventors have found that, when the conjugated diene-based rubber component is used in the form of a copolymer having a specific structure while the components and component ratio of the copolymer are controlled, the toughness of the film including the conjugated diene-based compound can be improved, and the decreases in stability and heat resistance that are known as problems caused by the conjugated diene-based compound can be avoided.

In the present invention, the graft copolymers containing the conjugated diene-based rubber component may be included in an amount of 20-65 parts by weight, based on 100 parts by weight of the acrylic resin serving as a matrix. If the graft copolymers are included in an amount of less than 20 parts by weight, the toughness of the optical film will be reduced, and if the graft copolymers are included in an amount of more than 65 parts by weight, it will be difficult to process the film, and the haze of the film will be increased, and the glass transition temperature of the film will be reduced.

In the present invention, at least two of the graft copolymers containing the conjugated diene-based rubber preferably have different particle sizes. As used herein, the term "particle sizes" refers to the particle sizes of the core components of the graft copolymers.

It is advantageous to increase the particle sizes of the graft copolymers in order to improve the toughness of the film, but in this case, there is a problem in that the total haze of the optical film is increased by increase of the external roughness of the film. Specifically, the haze of the film is mostly attributable to roughness caused by the rubber protruded from the surface of the film.

However, in the present invention, by using a graft copolymer having a relatively large particle size together with a graft copolymer having a relatively small particle size, the total haze of the film can be reduced while maintaining the roughness thereof. Namely, the present invention is characterized in that graft copolymers having different particle sizes are used in order to reduce the surface roughness of the film while improving the toughness of the film. The toughness and surface roughness of the film slightly vary, depending on the kinds of graft copolymers used. Accordingly, by using rubbers having different particle sizes at a suitable ratio in consideration of the relationship between the toughness and roughness of the film depending on the kinds of graft copolymers, the external haze of the film can be reduced without impairing the toughness of the film.

For example, when the particle size of a graft copolymer showing optimal toughness is 300-400 nm, the graft copolymer is used in a mixture with a graft copolymer having a particle size of 100 nm or less, whereby the toughness of the film can be improved while the surface roughness of the film can be reduced to reduce the haze.

At least one of the graft copolymers containing the conjugated diene-based rubber component may have a particle size of 100 nm or less, preferably 50-100 nm, and at least one of the graft copolymers may have a particle size of 200 nm or more, preferably 300 nm or more, and more preferably, 200-400 nm.

In the present invention, when a graft copolymer having a particle size of 50-100 nm and a graft copolymer having a particle size of 200-400 nm are used as the graft copolymers containing the conjugated diene-based rubber component, the weight ratio thereof may be 45-85:15-55, preferably 50-80:20-50.

In the present invention, each of the graft copolymers containing the conjugated diene-based rubber may be a graft copolymer of a conjugated diene-based rubber with an acrylic resin. Although the form of the graft copolymer is not specifically limited, the graft copolymer preferably has a core-shell structure in which the conjugated diene-based rubber constitutes a core and the acrylic resin constitutes a shell surrounding the core.

The weight ratio of the conjugated diene-based rubber to the acrylic resin in the graft copolymers is preferably 10-50:90-50, and more preferably 15-45:85-55.

If the content of the conjugated diene-based rubber in the graft copolymers is less than 10 wt %, the toughness of the optical film will be insufficient, and if the content of the conjugated diene-based rubber is more than 50 wt %, the dispersibility of the graft copolymers can be reduced, so that the haze and coefficient of thermal expansion of the film can be abruptly increased and the glass transition temperature of the film can also be lowered.

The conjugated diene-based rubber that is used in the graft copolymers is not specifically limited, but may be ethylene-propylene-diene-based rubber or butadiene-based rubber. Butadiene-based rubber is preferably used.

The acrylic resin in the graft copolymers is not specifically limited, but may be a homo- or copolymer of an acrylic monomer; a copolymer of an acrylic monomer and an aromatic vinyl monomer; a copolymer of an acrylic monomer, an aromatic vinyl monomer and an acrylonitrile monomer; a copolymer of an acrylic monomer, a aromatic vinyl monomer and an acid anhydride; or a copolymer of an acrylic monomer, an aromatic vinyl monomer, an acrylonitrile monomer and an acid anhydride.

As the acrylic monomer, any compound having a double bond between the carbonyl group of the ester group and the conjugated carbons may be used, and the substituent groups thereof are not specifically limited. As used herein, the term "acrylic monomer" is meant to include acrylates and acrylate derivatives, including alkyl acrylate, alkyl methacrylate, alkyl butacrylate and the like. Examples of the acrylic monomer include compounds represented by the following formula 1:

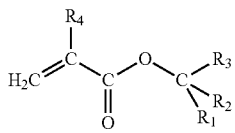

[Formula 1]

wherein $R_1$, $R_2$ and $R_3$ each independently represent a hydrogen atom or a $C_{1-30}$ monovalent hydrocarbon group that includes or does not include a hetero atom, at least one of $R_1$, $R_2$ and $R_3$ may be an epoxy group, and $R_4$ represents a hydrogen atom or a $C_{1-6}$ alkyl group.

Specifically, the acrylic monomer that is used in the present invention may be at least one selected from the group consisting of methyl acrylate, ethyl acrylate, methyl methacrylate, ethyl methacrylate, methyl ethacrylate, and ethyl ethacrylate. In particular, it is most preferable to use methyl methacrylate (MMA).

The aromatic vinyl monomer that may be used in the present invention is preferably a monomer having a structure in which the benzene nucleus is substituted or unsubstituted with one or more $C_1$-$C_5$ alkyl groups or halogen groups. For example, it is preferable to use at least one styrene monomer selected from the group consisting of styrene and α-methyl styrene.

The acrylonitrile monomer that may be used in the present invention is preferably at least one selected from the group consisting of acrylonitrile, methacrylonitrile, and ethacrylonitrile.

The acid anhydride that is used in the present invention may be carboxylic acid anhydride. In particular, monovalent or polyvalent carboxylic acid anhydride may be used. Preferably, maleic acid anhydride or a derivative thereof may be used. For example, a compound represented by the following formula 2 may be used.

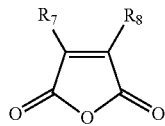

[Formula 2]

wherein $R_7$ and $R_8$ each independently represent a hydrogen atom or a $C_{1-6}$ alkyl group.

In the present invention, when the acrylic resin in the graft copolymers is either a copolymer of an acrylic monomer, an aromatic vinyl monomer and an acrylonitrile, or a copolymer of an acrylic monomer, an aromatic vinyl monomer and acid anhydride, the weight ratio of the monomers is preferably 55-80:10-30:4-15.

The conjugated diene-based rubber component and the acrylic resin can be graft-polymerized using a method known in the art. For example, a conventional emulsion polymerization method may be used. It is preferable that the graft ratio be in the range of 30 to 80%. The particle size of the core including the conjugated diene-based rubber component is preferably 60-400 nm, and more preferably 80-300 nm, but the scope of the present invention is not limited thereto.

In the present invention, a compound known in the art may be used as the acrylic resin serving as the matrix of the optical film. In particular, it is preferable to use a copolymer of an acrylic monomer, an aromatic vinyl monomer and an acrylonitrile monomer; a copolymer of an acrylic monomer, an aromatic vinyl monomer and an acid anhydride; or a copolymer of an acrylic monomer, an aromatic vinyl monomer, an acrylonitrile monomer and an acid anhydride.

When either the copolymer of the acrylic monomer, the aromatic vinyl monomer and the acrylonitrile monomer, or the copolymer of the acrylic monomer, the aromatic vinyl monomer or the acid anhydride is used as the matrix resin, the weight ratio of the monomers is preferably 55-80:10-30:4-15. Examples of the monomers are the same as those of the components described with respect to the acrylic resin of the graft copolymers. The acrylic monomer may contribute to optical properties, the aromatic vinyl monomer may contribute to the formability and the retardation provision of the film, and the acrylonitrile monomer and the acid anhydride may contribute to the heat resistance thereof. The matrix resin may be polymerized using a method known in the art. For example, a bulk polymerization method may be used.

The copolymer that constitutes the acrylic resin serving as the matrix may additionally include at least one monomer selected from among (meth)acrylic acid and imide monomers as an additional comonomer. Acrylic acid, methacrylic acid, or a derivative thereof may be used as the (meth)acrylic acid. Phenyl maleimide, cyclohexyl maleimide or the like may be used as the imide monomer. When the (meth)acrylic acid and imide monomers are included, each of the monomers is preferably included in an amount of 15 parts by weight or less, based on 100 parts by weight of the copolymer.

The above-mentioned matrix resin is characterized in that it has a glass transition temperature of 120 to 130° C., a molecular weight of 110000-150000, an MI (220° C., 10 kg) of 10 or less, and preferably 4-10, and a haze of 0.1-2%. The MI is an index indicating the flow of the resin and means the flow of the resin per minute when a load of 10 kg is applied at 220° C. In addition, the matrix resin preferably has a refractive index of 1.48-1.545, and more preferably 1.485-1.535, such that the transparency required in the optical film can be achieved.

The optical film according to the present invention may be manufactured by forming a film using the resin composition including the graft copolymers and the acrylic resin.

The film can be formed using a method known in the art. The optical film according to the present invention can be manufactured by an extrusion process in addition to a casting process, unlike a film made of an acrylic resin.

In order to manufacture the optical film, general additives, for example, a plasticizer, a lubricant, an impact modifier, a stabilizer, a UV absorber and the like, may be added to the resin composition. In particular, when the optical film according to the present invention is used as a protective film for a polarizer, it is preferable to add a UV absorber to the resin composition in order to protect the polarizer and the liquid crystal panel from external ultraviolet rays. Preferred examples of the UV absorber that may be used in the present invention include, but are not limited to, a benzotriazolebased UV absorber, a triazine-based UV absorber, and a hindered amine-based light stabilizer such as bis(2,2,6,6-tetramethyl-4-piperidyl)sebaceate. Preferably, Tinuvin 326, Tinuvin 327, Tinuvin 328, Tinuvin 321, Tinuvin 770 and Tinuvin 360 may be used. In addition, Igafos 168, Iganox 1076, or Iganox 245 may be added as the thermal stabilizer.

The thickness of the optical film according to the present invention may be 20-200 µm, and preferably 40-120 µm. The optical film according to the present invention has a glass transition temperature of 110 to 130° C., a heat distortion temperature (Vicat) of 110 to 140° C., an MI (220° C., 10 kg) of 2-8, and an excellent toughness. In addition, the optical film according to the present invention preferably has a coefficient of thermal expansion (CTE) (ppm/K, 40 to 90° C.) of 50-120, a haze of 0.5-3%, and a transmittance of 88-93%. In addition, the optical film according to the present invention has an external roughness of 50 nm or less, and preferably 0.1-50 nm.

The optical film according to the present invention may have in-plane retardation and thickness-direction retardation values of 0-10 nm before being stretched and may have in-plane retardation and thickness-direction retardation values of 80-200 nm when being uniaxially or biaxially stretched.

A process of stretching the optical isotropic film according to the present invention is preferably performed at a temperature ranging from Tg−30° C. to Tg+30° C., and more preferably at a temperature ranging from Tg−10° C. to Tg+20° C., based on the glass transition temperature (Tg) of the resin composition. In addition, the stretching speed and the stretching ratio may be appropriately controlled within a range that achieves the object of the present invention.

The optical film according to the present invention may be used as a polarizer protective film. In this case, the surface of the film may be modified in order to improve the adhesive strength thereof. Examples of the surface modification method include a method of treating the surface of the protective film by a corona treatment, a plasma treatment or a UV treatment, and a method of forming a primer layer on the surface of the protective film. Any of the methods may be used in combination. The type of the primer is not specifically limited, but it is preferable to use a compound having a reactive functional group, such as a silane coupling agent.

A polarizing plate that includes the optical film according to the present invention as a protective film may have a structure that includes a polarizer and a protective film provided on at least one side of the polarizer, in which at least one of the protective films is the optical film according to the present invention.

In the present invention, any polarizer known in the art may be used without any particular limitation. For example, a film based on polyvinyl alcohol (PVA) containing iodine or dichroic dyes may be used. The polarizer may be manufactured by applying iodine or dichromatic dyes on the PVA film. However, the method of manufacturing the polarizer is not specifically limited. As used herein, the term "polarizer" means a state including no protective film, and the term "polarizing plate" means a state including a polarizer and a protective film.

The adhesion of the protective film to the polarizer may be performed using an adhesive layer. As an adhesive which can be used to laminate the protective film on the polarizer, any adhesive known in the art may be used without any particular limitation. Examples of the adhesive include, but are not limited to, a one- or two-component polyvinyl alcohol (PVA)-based adhesive, a polyurethane-based adhesive, an epoxy-based adhesive, a styrene-butadiene rubber (SBR) adhesive, a hot melt type adhesive and the like.

Among these adhesives, the polyvinyl alcohol-based adhesive is preferably used. In particular, it is preferable to use an adhesive that contains a polyvinyl alcohol-based resin with an acetacetyl group and an amine-based metal compound crosslinking agent. The adhesive for the polarizing plate may contain 100 parts by weight of the polyvinyl alcohol-based resin having the acetacetyl group and 1-50 parts by weight of the amine-based metal compound crosslinking agent.

The polyvinyl alcohol-based resin is not specifically limited, as long as it can provide sufficient adhesion between the polarizer and the protective film and has excellent optical penetration and also does not undergo changes such as yellowing with the passage of time. In consideration of a smooth crosslinking reaction with the crosslinking agent, the polyvinyl alcohol-based resin containing the acetacetyl group is preferably used.

The degree of polymerization of the polyvinyl alcohol-based resin and the degree of saponification of the polyvinyl alcohol-based resin are not specifically limited as long as the polyvinyl alcohol-based resin contains the acetacetyl group, but it is preferable that the degree of polymerization be 200-4,000 and the degree of saponification be 70-99.9 mol %. In consideration of smooth mixing with the contained material according to the free movement of molecules, it is more preferable that the degree of polymerization be 1,500-2,500 and the degree of saponification be 90-99.9 mol %. Herein, the polyvinyl alcohol-based resin preferably contains 0.1-30 mol % of the acetacetyl group. In this range of the content of the acetacetyl group, the reaction with the crosslinking agent can be smooth and the desired adhesive can have sufficient water resistance and adhesive strength.

The amine-based metal compound crosslinking agent is a water-soluble crosslinking agent that contains a functional group having reactivity with the polyvinyl alcohol-based resin. It is preferably a metal complex containing an amine-based ligand. Examples of a metal that can be contained in the crosslinking agent include transition metals such as zirconium (Zr), titanium (Ti), hafnium (Hf), tungsten (W), iron (Fe), cobalt (Co), nickel (Ni), ruthenium (Ru), osmium (Os), rhodium (Rh), iridium (Ir), palladium (Pd), and platinum (Pt). As the ligand that is coupled to the central metal, any ligand containing at least one amine group, such as a primary amine, a secondary amine (diamine), a tertiary amine, or ammonium hydroxide, may be used. The amount of crosslinking agent used is preferably controlled within the range of 1 to 50 parts by weight, based on 100 parts by weight of the polyvinyl alcohol-based resin. In this range of the content of the crosslinking agent, it is possible to provide significant adhesive strength to the desired adhesive and to improve the storage stability (pot life) of the adhesive.

The pH of the adhesive aqueous solution that contains the polyvinyl alcohol-based resin containing the acetacetyl group and the amine-based metal compound crosslinking agent is preferably adjusted to 9 or less using a pH-adjusting agent. More preferably, the pH may be adjusted to be within the range of more than 2 to 9 or less, and even more preferably 4 to 8.5.

The adhesion of the protective film to the polarizer may be performed using a method which includes applying an adhesive to the surface of the polarizer protective film or the polarizer PVA film using a roll coater, a gravure coater, a bar coater, a knife coater or a capillary coater, and then laminating the protective film on the polarizer film using a laminating roll by pressing in a heated condition or at ambient temperature before the adhesive is completely dried. When a hot melt type adhesive is used, a heat-pressing roll is used.

When a polyurethane-based adhesive is used, it is preferable to use a polyurethane-based adhesive produced using an aliphatic isocyanate compound which does not undergo yellowing by light. If a one- or two-component dry laminating adhesive or an adhesive having relatively low reactivity with an isocyanate group and a hydroxyl group is used, a solution type adhesive diluted with an acetate solvent, a ketone solvent, an ether solvent or an aromatic solvent may be used. In this connection, the adhesive preferably have a low viscosity of 5000 cps or less. Preferably, the adhesives have excellent storage stability and a light transmittance of 90% or more at a wavelength of 400-800 nm.

Any adhesive may be used as long as it can exhibit sufficient adhesive strength. The adhesive that is used in the present invention is sufficiently cured by heat or ultraviolet rays after lamination, so that mechanical strength thereof is ensured. Also, the interfacial adhesion of the adhesive is large so that delamination does not occur as long as any one of both the films having the adhesive attached thereto is not destroyed.

Specific examples of the adhesive include a natural rubber, synthetic rubber or elastomer having excellent optical transparency, a vinyl chloride/vinyl acetate copolymer, polyvinyl alkyl ether, polyacrylate, a modified polyolefin adhesive, and a curable adhesive containing a curing agent such as isocyanate.

The polarizing plate that is manufactured as described above may be used in various applications. Specifically, the polarizing plate may preferably be used in image display devices, including a polarizing plate for LCDs and an anti-reflective polarizing plate for organic EL display devices. In addition, the optical film according to the present invention may be applied to a complex polarizing plate in which various optical layers such as various functional layers, for example, a retardation plate such as a λ/4 plate and a λ/2 plate, an optical diffusion plate, a viewing angle-enlarging plate, a luminance-improving plate, and a reflection plate are combined with each other.

The polarizing plate may include an adhesive layer on at least one side thereof so as to be easily applied to image display devices and the like. In addition, the polarizing plate may further include a release film on the adhesive layer in order to protect the adhesive layer until the polarizing plate is applied to an image display device.

The present invention provides an electronic device including the optical film or the retardation film. The electronic device may be an image display device such as an LCD.

For example, the present invention provides an image display device including: a light source, a first polarizing plate, a liquid crystal cell, and a second polarizing plate, which are sequentially layered in that order; and the optical film or the retardation film according to the present invention as a protective film for at least one of the first polarizing plate and the second polarizing plate or as a retardation film provided between at least one of the first polarizing plate and the second polarizing plate and a liquid crystal cell.

The liquid crystal cell includes: a liquid crystal layer; a substrate capable of supporting the liquid crystal layer; and an electrode layer for applying voltage to the liquid crystal. Herein, the polarizing plate according to the present invention may be applied to all liquid crystal modes, including an In-Plane Switching mode (IPS mode), a Vertically Aligned mode (VA mode), an OCB mode (Optically Compensated Birefringence mode), a Twisted Nematic mode (TN mode), and a Fringe Field Switching mode (FFS mode).

Hereinafter, the present invention will be described in further detail with reference to examples. It is to be understood, however, that these examples are for illustrative purposes only and are not to be construed as limiting the scope of the present invention.

Example 1

A resin composition consisting of the following components was dry-blended: 78 wt % of a matrix resin having an SM-MMA-MAH (styrene-methylmethacrylate-maleic anhydride) ratio of 23:70:7 wt % and a weight-average molecular weight of 130,000; 15 wt % of an impact modifier having a molecular weight of 130,000 (except for the rubber), a core (butadiene rubber)-to-shell (SM-MMA-AN=25:70:5) ratio of 25:75 and a particle size of 90 nm; and 7 wt % of an impact modifier having a core-to-shell ratio of 40:60 and a particle size of 300 nm. The dry-blended composition was extruded through a unidirectional biaxial extruder to prepare a pellet-shaped heat-resistant blend. The prepared pellets were dried, and then passed through an extruder including a T-die, thus manufacturing a film having a thickness of 80 μm. The physical properties of the manufactured film were measured, and the results of the measurement are shown in Table 1 below.

Example 2

The physical properties of a film were measured in the same manner as Example 1, except that a resin composition consisting of the following components was used: 80 wt % of a matrix resin having an SM-MMA-MAH (styrene-methylmethacrylate-maleic anhydride) ratio of 23:70:7 wt % and a weight-average molecular weight of 130,000; 10 wt % of an impact modifier having a molecular weight of 130,000 (except for the rubber), a core (butadiene rubber)-to-shell (SM-MMA-AN=25:70:5) ratio of 25:75 and a particle size of 90 nm; and 10 wt % of an impact modifier having a core-to-shell ratio of 40:60 and a particle size of 300 nm. The results of the measurement are shown in Table 1 below.

Example 3

The physical properties of a film were measured in the same manner as Example 1, except that a resin composition consisting of the following components was used: 75 wt % of a matrix resin having an SM-MMA-MAH (styrene-methylmethacrylate-maleic anhydride) ratio of 23:70:7 wt % and a weight-average molecular weight of 130,000; 15 wt % of an impact modifier having a molecular weight of 130,000 (except for the rubber), a core (butadiene rubber)-to-shell (SM-MMA-AN=25:70:5) ratio of 25:75 and a particle size of 90 nm; and 10 wt % of an impact modifier having a core-to-shell ratio of 40:60 and a particle size of 300 nm. The results of the measurement are shown in Table 1 below.

Comparative Example 1

The physical properties of a film were measured in the same manner as Example 1, except that a resin composition consisting of the following components was used: 80 wt % of a matrix resin having an SM-MMA-MAH (styrene-methylmethacrylate-maleic anhydride) ratio of 23:70:7 wt % and a weight-average molecular weight of 130,000; and 20 wt % of an impact modifier having a molecular weight of 130,000 (except for the rubber), a core (butadiene rubber)-to-shell (SM-MMA-AN=25:70:5) ratio of 25:75 and a particle size of 90 nm. The results of the measurement are shown in Table 1 below.

Comparative Example 2

The physical properties of a film were measured in the same manner as Example 1, except that a resin composition consisting of the following components was used: 80 wt % of a matrix resin having an SM-MMA-MAH (styrene-methyl-methacrylate-maleic anhydride) ratio of 23:70:7 wt % and a weight-average molecular weight of 130,000; and 20 wt % of an impact modifier having a molecular weight of 130,000 (except for the rubber), a core-to-shell ratio of 40:60 and a particle size of 300 nm. The results of the measurement are shown in Table 1 below.

Comparative Example 3

The physical properties of a film were measured in the same manner as Example 1, except that a resin composition consisting of the following components was used: 80 wt % of a matrix resin having an SM-MMA-MAH (styrene-methyl-methacrylate-maleic anhydride) ratio of 23:70:7 wt % and a weight-average molecular weight of 130,000; 10 wt % of an impact modifier having a molecular weight of 130,000 (except for the rubber), a core-to-shell ratio of 25:75 and a particle size of 130 nm; and 10 wt % of an impact modifier having a core-to-shell ratio of 40:60 and a particle size of 280 nm. The results of the measurement are shown in Table 1 below.

Comparative Example 4

The physical properties of a film were measured in the same manner as Example 1, except that a resin composition consisting of the following components was used: 80 wt % of a matrix resin having an SM-MMA-MAH (styrene-methyl-methacrylate-maleic anhydride) ratio of 23:70:7 wt % and a weight-average molecular weight of 130,000; 10 wt % of an impact modifier having a molecular weight of 130,000 (except for the rubber), a core-to-shell ratio of 25:75 and a particle size of 170 nm; and 10 wt % of an impact modifier having a core-to-shell ratio of 40:60 and a particle size of 220 nm. The results of the measurement are shown in Table 1 below.

Comparative Example 5

The physical properties of an unstretched TAC Film (80 μm thickness, Fuji Film Co., Ltd.) were measured and the results of the measurement are shown in Table 1 below.

(1) Haze and luminous transmittance—measured in accordance with the ASTM 1003 method.

(2) Toughness measured by bending the 80-μm-thickness film 10 times by hand and checking the breakage of the film (○: no breakage, Δ: breakage occurs one to three times, and X: breakage occurs four times or more).

(3) Tg (glass transition temperature)—measured using Pyris 6 DSC (Differential Scanning calorimeter) manufactured by Perkin Elmer, Inc.

(4) Surface roughness (nm)—the surface of the film was measured using an AFM device.

As can be shown in Table 1, the optical films manufactured in Examples 1 to 3 all showed excellent toughness, low haze and a high glass transition temperature of 120° C. or higher. On the other hand, in Comparative Example 1, in which only the conjugated diene-based rubber-containing graft copolymer having a small particle size was used, sufficient toughness could not be obtained. In addition, in the case in which only the conjugated diene-based rubber-containing graft copolymer having a large particle size was used, the haze of the film greatly increased.

While the present invention has been shown and described in connection with the exemplary embodiments, it will be apparent to those skilled in the art that modifications and variations can be made without departing from the spirit and scope of the invention as defined by the appended claims.

The invention claimed is:

1. An optical film comprising:
   a) an acrylic resin; and
   b) 20-65 parts by weight of a graft copolymer having a core-shell structure in which a conjugated diene-based rubber constitutes a core and an acrylic resin constitutes shell, based on 100 parts by weight of the acrylic resin,
   the graft copolymer b) including a graft copolymer having a particle size of 50 to 100 nm and a graft copolymer having a particle size of 200 to 400 nm,
   the acrylic resin a) including a copolymer of an acrylic monomer, an aromatic vinyl monomer and an acrylonitrile monomer; a copolymer of an acrylic monomer, an aromatic vinyl monomer and an acid anhydride; and a copolymer of an acrylic monomer, an aromatic vinyl monomer, an acrylonitrile monomer and an acid anhydride; or a combination thereof, and
   the conjugated diene-based rubber including ethylene-propylene-diene rubber, butadiene rubber, or a combination thereof,
   wherein the weight ratio of the conjugated diene-based rubber to the acrylic resin in the graft copolymer b) is 15-45:85-55, and

TABLE 1

| No. | Example 1 | Example 2 | Example 3 | Comp. Example 1 | Comp. Example 2 | Comp. Example 3 | Comp. Example 4 | Comp. Example 5 |
|---|---|---|---|---|---|---|---|---|
| Tg (° C.) | 122 | 120 | 120 | 125 | 118 | 120 | 118 | 130 |
| Haze (%) | 0.9 | 1.2 | 1.4 | 0.6 | 2.5 | 2.1 | 2.5 | 0.1 |
| Toughness | ○ | ○ | ○ | X | ○ | ○ | ○ | ○ |
| Luminous transmittance (%) | 92 | 91 | 90 | 90 | 90 | 91 | 90 | 92 |
| Surface roughness (nm) | 20 | 25 | 30 | 14 | 55 | 50 | 49 | 0.2 | wherein the acrylic resin in the graft copolymer b) is a copolymer of an acrylic monomer, an aromatic vinyl monomer and an acrylonitrile monomer.

2. The optical film of claim 1, wherein the optical film has an external roughness of 0.1-50 nm.

3. The optical film of claim 1, wherein the optical film has a softening temperature (Vicat) of 100-140° C., a glass transition temperature of 110 to 130° C., an MI (220° C., 10 kg) of 2-8, which is a criterion measuring an amount of flow of resin and refers to the amount of flow of the resin per a minute when pressing the optical film with a weight of 10 kg at 220° C., a coefficient of thermal expansion (CTE) (ppm/K, 40 to 90° C.) of 50-120, a haze of 0.5-3%, and a transmittance of 88-93%.

4. The optical film of claim 1, wherein the optical film has in-plane retardation and thickness-direction retardation values of 0-10 nm.

5. The optical film of claim 1, wherein the copolymer in the acrylic resin a) further comprises at least one monomer, which is selected from among (meth)acrylic acid and imide monomers, as an additional comonomer.

6. A retardation film manufactured by stretching the optical film of claim 1.

7. The retardation film of claim 6, wherein the retardation film has in-plane retardation and thickness-direction retardation values of 80-200 nm.

8. An electronic device comprising the retardation film of claim 6.

9. A polarizing plate comprising:
a polarizer; and
protective films provided on one or more sides of the polarizer,
wherein at least one of the protective films is the optical film of claim 1.

10. An electronic device comprising the optical film of claim 1.

11. A method of manufacturing an optical film, comprising:
preparing a resin composition including a) an acrylic resin; and b) 20-65 parts by weight of a graft copolymer having a core-shell structure in which a conjugated diene-based rubber constitutes a core and an acrylic resin constitutes shell, based on 100 parts by weight of the acrylic resin a); and
forming a film by using the resin composition,
the graft copolymer b) including a graft copolymer having a particle size of 50 to 100 nm and a graft copolymer having a particle size of 200 to 400 nm,
the acrylic resin a) including a copolymer of an acrylic monomer, an aromatic vinyl monomer and an acrylonitrile monomer; a copolymer of an acrylic monomer, an aromatic vinyl monomer and an acid anhydride; and a copolymer of an acrylic monomer, an aromatic vinyl monomer, an acrylonitrile monomer and an acid anhydride; or a combination thereof, and
the conjugated diene-based rubber including ethylene-propylene-diene rubber, butadiene rubber, or a combination thereof,
wherein the weight ratio of the conjugated diene-based rubber to the acrylic resin in the graft copolymer b) is 15-45:85-55, and
wherein the acrylic resin in the graft copolymer b) is copolymer of an acrylic monomer, an aromatic vinyl monomer and an acrylonitrile monomer.

* * * * *